Figure 1:
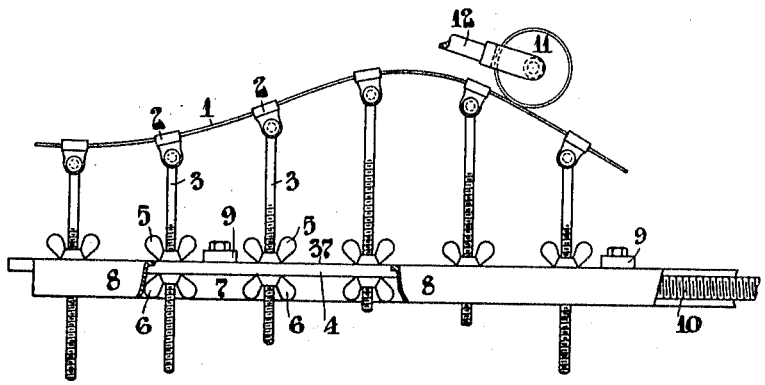

W. W. PILKINGTON, DEC'D.
S. L., R. A. & A. C. PILKINGTON, EXECUTORS.
APPARATUS FOR DRAWING GLASS.
APPLICATION FILED NOV. 10, 1913.

1,118,579.

Patented Nov. 24, 1914.

Witnesses

Inventor
William W. Pilkington
per
Attorneys

W. W. PILKINGTON, DEC'D.
S. L., R. A. & A. O. PILKINGTON, EXECUTORS.
APPARATUS FOR DRAWING GLASS.
APPLICATION FILED NOV. 10, 1913.

1,118,579.

Patented Nov. 24, 1914.

3 SHEETS—SHEET 3.

Witnesses

Inventor
William W. Pilkington
per
Attorneys

UNITED STATES PATENT OFFICE.

WILLIAM WINDLE PILKINGTON, OF PRESCOT, ENGLAND; SARAH LOUISA PILKINGTON, RICHARD AUSTIN PILKINGTON, AND ALFRED CECIL PILKINGTON, EXECUTORS OF SAID WILLIAM WINDLE PILKINGTON, DECEASED, ASSIGNORS TO PILKINGTON BROTHERS, LIMITED, OF ST. HELENS, ENGLAND.

APPARATUS FOR DRAWING GLASS.

1,118,579.      Specification of Letters Patent.      Patented Nov. 24, 1914.

Original application filed August 25, 1911, Serial No. 646,049. Divided and this application filed November 10, 1913. Serial No. 800,030.

*To all whom it may concern:*

Be it known that I, WILLIAM WINDLE PILKINGTON, a subject of the King of the United Kingdom of Great Britain and Ireland, residing at "The Hazel," Prescot, in the county of Lancaster, England, have invented new and useful Improvements in or Relating to Apparatus for Drawing Glass, of which the following is a specification.

My invention relates to improvements in apparatus for drawing glass cylinders and sheets.

In drawing glass cylinders, the cylinder is drawn at a rate which varies from start to finish, the rate of draw at the start and at the finish being such as to produce special formations of the ends of the cylinder, and the rate of draw of the main body of the cylinder being gradually increased to compensate for the gradual cooling of the glass in the pot. At the same time and for the same reasons the rate of supply of air to the cylinder is varied from start to finish. These variations in the rate of draw and in the rate of supply of air are usually produced by automatic devices acting in conjunction with a winding apparatus running at constant speed and with a supply of air under constant pressure, the variations at the start and the finish being sometimes produced by hand regulation instead of automatically.

The ordinary automatic device for varying the rate of draw consists of a conical pulley or drum on the winding apparatus. The ordinary automatic device for varying the rate of supply of air consists of a valve in the air supply pipe or in a vent from the pipe which is acted on directly or indirectly by gear and link-work from the winding apparatus. Now in such apparatus, while it is possible to vary the rate of draw throughout the operation by altering the constant speed of the winding apparatus, and to vary the rate of air supply throughout the operation by altering the constant air pressure or adjusting the valve, or the link-work actuating the valve, it is not possible, without altering the mechanical device determining the rate of variation, to alter the relative rates of variation of either factor from one point to another of the draw, or, as I shall term it hereinafter, to alter the law of variation of either factor. The law of variation cannot thereafter be altered during the drawing operation, nor in practice can it be altered from one draw to another. It is however often desirable to effect an alteration in the law of variation of the rate of draw or of the rate of air supply, in consequence of alterations in the temperature and nature of the glass, and in the temperature of the atmosphere, and for other reasons. Moreover, it is found that if the rate of draw be changed in any way, even without changing its law of variation, a change has to be made in consequence, not merely in the rate of air supplied but in its law of variation.

The object of the present invention is to provide devices determining the law of variation of the rate of draw, which can be easily and quickly adjusted so as to give any desired law of variation in the rate; the said invention is not concerned with the determination of the law of variation of the rate of air supplied, as that is fully dealt with in a separate application for Letters Patent Serial Number 646,049 filed August 25th, 1911, from which the present application has been divided.

According to my invention the law of variation is determined wholly or in part by the surface of a cam, the cam being of such construction that the form of its surface can be easily and quickly changed.

I do not confine myself to the use of any particular construction of variable cam, and it is to be understood that I make no claim to a variable cam of any construction apart from its application to apparatus for drawing glass.

In applying the device, I actuate the cam either at constant speed by a suitable motor, as for instance by the motor driving the winding apparatus, or at a variable speed by the drawing carriage or its connections, and I cause a wiper roller or other device acted on by this variable cam, to vary the speed of the driving motor by any of the well-known methods of electrical control, or to displace the cord of the driving carriage so as to vary its length between two pulleys. In the latter case, and also in the former case, if the winding apparatus has the usual conical drum, the cam super-imposes variations in the normal rate of variation, but, by giving the winding apparatus a cylindrical drum, it may be employed to give the whole variations. Where the winding apparatus is not driven directly by a motor, the intermediate gearing may be of a variable speed type, such as a pair of conical pulleys with belt or a pair of friction disks in planes at right angles to each other, and then the wiper or roller may actuate the variable speed gear. The functions of the cam and of the wiper or roller may be reversed so that the cam is the driven part and the wiper or roller the driving part.

Figure 2:
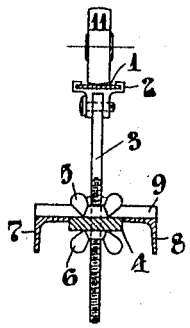
Figure 3:
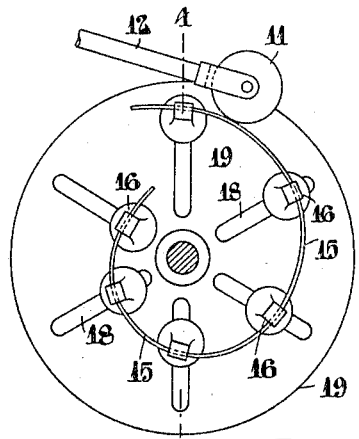
Figure 4:
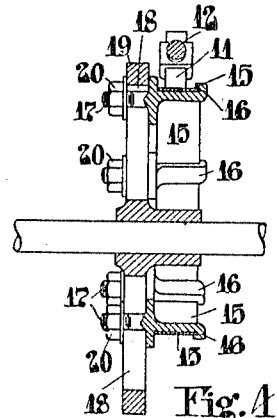
Figure 5:
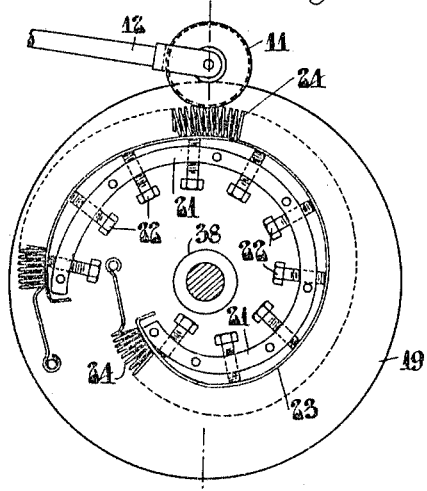
Figure 6:
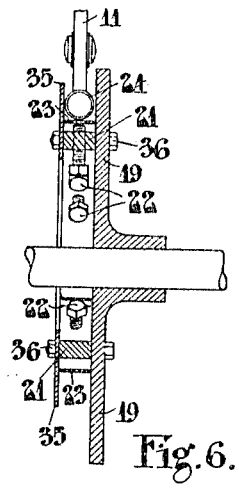
Figure 7:
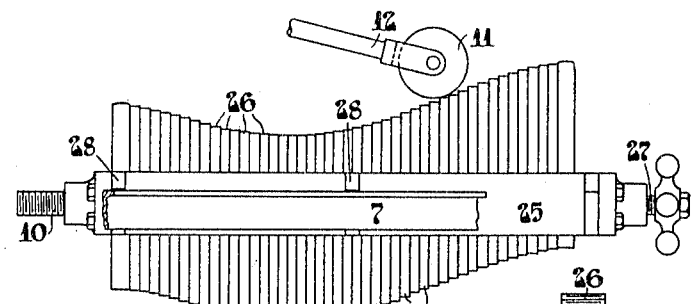
Figure 9:
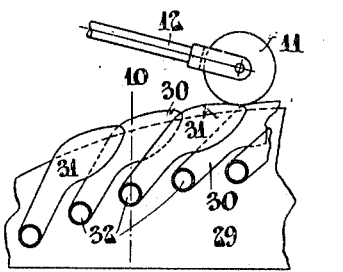
Figure 10:
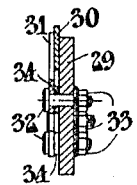
Figure 11:
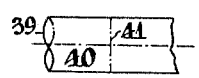

In the accompanying drawings which are to be taken as part of this specification and read therewith, Figure 1 is an elevation partly broken away, of one form of variable cam; Fig. 2 is a vertical section thereof; Fig. 3 is an elevation of another form of variable cam; Fig. 4 is a diametral section on the line 4—4 of Fig. 3; Fig. 5 is an elevation of another form of variable cam; Fig. 6 is a diametral section on the line 6—6 of Fig. 5; Fig. 7 is an elevation and Fig. 8 a vertical section of another form of variable cam; Fig. 9 is an elevation of part of another form of variable cam; Fig. 10 is a vertical section on the line 10—10 of Fig. 9, and Fig. 11 is a diagrammatic view of another form of the cam which can be applied to the purposes of this invention.

Referring to the device shown in Figs. 1 and 2, 1 is a flexible strip of steel held in channel clamps or clips 2 having their ends turned in, as shown in Fig. 2, the strip being free to slide through the clamps. These clamps are pivoted to screw-threaded rods 3 which pass loosely through holes in a bar 4 and are adjustably secured to the latter by wing nuts 5 and 6. The bar 4 is guided between two angle iron guides 7 and 8 forming the supporting frame-work, and it is supported on them by cross pieces 9 secured to the said bar. The bar 4 with the rods 3 and flexible strip 1 thus attached to it, is moved endwise by the drawing apparatus or an independent motor to which it is attached in any convenient manner. For instance, the motor may drive a worm wheel to which is attached a nut on a screw 10 fixed to the bar 4. A roller 11 on the end of the lever 12 is the instrument through which the aforesaid control is exercised on the driving motor or upon the cord of the driving carriage, and this roller may be kept in contact with the surface of the strip by its own weight or by a spring, or by both. As the bar 4 is moved in correspondence with the progress of the draw, so will the roller 11 be operated in correspondence with the form given to the flexible strip 1. The form of the strip 1 and consequently the rate of draw at any point may be varied by loosening one and tightening the other of the two wing nuts 5 and 6 on any of the rods 3. Such variation may be effected not merely between one draw and another but during the progress of a draw.

Figs. 3 and 4 show a device somewhat similar to that just described, but mounted on a disk which is rotated by a connection to the drawing apparatus or otherwise. The flexible strip 15 of this arrangement is held in clamps 16 integral with screw-threaded studs 17 which pass through radial slots 18 in the disk 19. The clamps 16 can be fixed at any radial distance from the axis of rotation within the limits of the slots 18 by nuts 20 on the studs 17. The form of the strip 15 can be varied by moving one or more of the clamps 16 along the respective slots 18, the clamps being free to turn and adapt themselves to varying tangents of the strip.

Figs. 5 and 6 show a third form of the device which, like that last described, is mounted on a rotating disk 19. A bar 21, fixed to the disk 19, is given a form approximating to the general form which it is desired to give to the cam. A number of set screws or bolts 22 pass through the bar 21 and serve to keep a flexible strip 23 at varying distances from the bar. The strip 23 is held in contact with the outer ends of the set screws 22 by a spiral spring 24 which is held taut by being attached to the disk 19 at its respectively opposite ends. The spiral spring 24 serves also as the surface on which the roller 11 bears, and it is prevented from shifting by means of a ring 35, Fig. 6, secured, as by bolts and nuts 36, to the bar 21; for the sake of clearness the device is shown in Fig. 5, as with the ring 35 removed.

Figure 8:
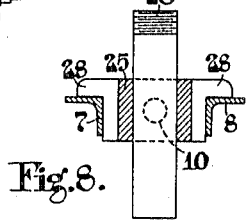

Figs. 7 and 8 show a fourth form of the device, consisting of a rectangular frame 25 containing a number of thin plates 26. These plates can be clamped together by hand screw 27 so as to constitute of them practically a solid block. On slackening the hand screw 27, but not so much as to allow the plates to slide out of position, the plates 26 can be adjusted in the frame 25, so as to give any desired general contour to the surface formed by their ends, by tapping them smartly. When their ends have been tapped so that collectively they give the desired form or general contour of surface, they are clamped firmly in position by tightening up the hand screw 27. The whole frame 25 is supported and guided on angle iron guides 7, 8 by means of brackets 28 fast to the said frame, and it is arranged to be moved endwise by a screw 10, as in the form of device herein first described.

Figs. 9 and 10 show a fifth form of the device, consisting of a bar 29 longitudinally reciprocated as in the device illustrated in Figs. 1 and 2, and carrying a number of plates 30, 31, pivoted to the bar 29 by means of bolts 32, provided with nuts 33 by which the plates can be tightened against the bar. Each plate 30 lies close against the bar 29 the other plates (31) being held away from the bar by washers 34, Fig. 10, so that they can overlap the plates 30. The upper overlapping edges of the plates 30, 31 are so shaped as to form a cam surface of approximately the desired contour. By loosening the nuts 33 on the respective bolts 32, the plates 30, 31 can be turned about the said bolts so as to vary the shape of the cam surface formed by their upper edges, without materially disturbing the continuity of such surface, the said plates being afterward secured in their adjusted positions by again tightening the nuts 33.

The invention includes any modification characterized by the base-line of the cam being circular instead of straight or straight instead of circular, the variations of a cam surface having a circular base-line, being in respect of direction, either radial to, or parallel with, the axis of rotation. By "base-line" is meant the line from which a draftsman sets off the variations in the cam surface. The top line 37 of the bar 4 in Fig. 1, or any line parallel with it, as well as the circle 38 in Fig. 5 or any circle concentric with it, are both such base lines.

Fig. 11 illustrates diagrammatically one modification characterized by the variations of the cam surface 39 being parallel in respect of direction with the axis 40, 41 being the base-line.

The flexible member forming the cam surface may be composed of lead or rubber or of a spiral spring or of a combination of these or other materials or devices.

The devices hereinbefore described are applicable for determining the law of variation either of the rate of drawing glass, whether the latter be drawn in the form of cylinders or sheets, or of the rate of motion of the other devices sometimes employed, such as slots of variable width or at varying depths in the tank.

The flexible strips 1 and 15 constituting, as they do, the actual cam-surfaces, as hereinbefore described, are, for convenience, hereinafter referred to in the claims as flexible strip cams.

In the following claims I use the kinematical term "cam pair" to designate the combination of two members, one a cam surface and the other a means coöperating therewith, such as a wiper or roller.

Having described my invention I declare that what I claim and desire to secure by Letters Patent is:—

1. In apparatus for drawing glass, drawing gear comprising a motor and a drawing carriage, a speed regulating device to regulate the speed of draw and a variable cam pair of which one member is connected with the drawing gear and the other member is connected with the speed regulating device.

2. In apparatus for drawing glass, the combination with a flexible strip cam of a bar supporting the said strip, adjustable means connecting the strip to the bar for adjusting the distance between relatively opposite points in the said strip and bar, means operative to move the bar longitudinally and means coöperating with the flexible strip cam to operate the speed-regulating device of the drawing motor.

3. In apparatus for drawing glass, the combination with a flexible strip cam of a bar supporting the said strip, adjustable means connecting the strip to the bar for adjusting the distance between relatively opposite points in the said strip and bar, means operative to move the bar longitudinally and means coöperating with the flexible strip cam to operate the speed-varying device of the drawing carriage.

In witness whereof I have hereunto set my hand in the presence of two witnesses.

WILLIAM WINDLE PILKINGTON.

Witnesses:
BARTEN FLETCHER,
GRANVILLE HUGH BAILLIE.